United States Patent
Wright et al.

(10) Patent No.: US 12,126,741 B2
(45) Date of Patent: Oct. 22, 2024

(54) SYSTEMS AND METHODS FOR NON-PARALLELISED MINING ON A PROOF-OF-WORK BLOCKCHAIN NETWORK

(71) Applicant: nChain Licensing AG, Zug (CH)

(72) Inventors: Craig Steven Wright, London (GB); Jack Owen Davies, London (GB); Alexander Tennyson Mackay, London (GB); Chloe Ceren Tartan, London (GB); Wei Zhang, London (GB)

(73) Assignee: nChain Licensing AG, Zug (CH)

( * ) Notice: Subject to any disclaimer, the term of this patent is extended or adjusted under 35 U.S.C. 154(b) by 395 days.

(21) Appl. No.: 17/610,286

(22) PCT Filed: Apr. 28, 2020

(86) PCT No.: PCT/IB2020/053995
§ 371 (c)(1),
(2) Date: Nov. 10, 2021

(87) PCT Pub. No.: WO2020/229922
PCT Pub. Date: Nov. 19, 2020

(65) Prior Publication Data
US 2022/0217004 A1    Jul. 7, 2022

(30) Foreign Application Priority Data
May 16, 2019   (GB) .................................. 1906893

(51) Int. Cl.
*H04L 9/32* (2006.01)
*G06F 7/46* (2006.01)
(Continued)

(52) U.S. Cl.
CPC ............ *H04L 9/3297* (2013.01); *G06F 7/466* (2013.01); *G06F 7/723* (2013.01); *H04L 9/3006* (2013.01);
(Continued)

(58) Field of Classification Search
CPC ... H04L 9/3297; H04L 9/3006; H04L 9/3236; H04L 9/3247; H04L 9/50; H04L 2209/56; G06F 7/466; G06F 7/723
(Continued)

(56) References Cited

U.S. PATENT DOCUMENTS 9,892,460 B1 *   2/2018   Winklevoss ........... G06Q 40/04
10,068,228 B1 *  9/2018   Winklevoss ........... G06Q 20/34
(Continued)

FOREIGN PATENT DOCUMENTS

WO    2019033074 A1   2/2019

OTHER PUBLICATIONS

Andreas M Antonopoulos: "Mastering Bitcoin", Jul. 21, 2017 (Jul. 21, 2017), XP055570487, ISBN: 978-1-4919-5438-6, Retrieved from the Internet: URL:https://www.oreilly.com/library/view/mastering-bitcoin-2nd/9781491954379/ [retrieved on Mar. 18, 2019].
(Continued)

*Primary Examiner* — Samson B Lemma
(74) *Attorney, Agent, or Firm* — Messner Reeves LLP

(57) ABSTRACT

The present disclosure provides methods and systems for ensuring the security of a blockchain and associated network, and for enabling the establishment of consensus regarding the state of the blockchain. A method of the disclosure may be implemented by one or more nodes on a blockchain network, using a non-parallelisable algorithm to calculate an output based on a computational difficulty parameter, a hash of at least one blockchain transaction; and/or a hash of at least one blockchain block header. The
(Continued)

non-parallelisable, inherently sequential algorithm comprises at least one of the following operations or a combination thereof: a recursive operation, a modular exponentiation and/or a repeated squaring operation.

19 Claims, 2 Drawing Sheets

(51) Int. Cl.
  *G06F 7/72* (2006.01)
  *H04L 9/30* (2006.01)
  *H04L 9/00* (2022.01)

(52) U.S. Cl.
  CPC .......... *H04L 9/3236* (2013.01); *H04L 9/3247* (2013.01); *H04L 9/50* (2022.05); *H04L 2209/56* (2013.01)

(58) Field of Classification Search
  USPC .......................................................... 723/23
  See application file for complete search history.

(56) References Cited

U.S. PATENT DOCUMENTS

| | | | | |
|---|---|---|---|---|
| 10,262,140 | B2* | 4/2019 | Smith | G06F 21/575 |
| 10,269,009 | B1* | 4/2019 | Winklevoss | G06Q 20/105 |
| 10,666,426 | B2* | 5/2020 | Roets | G06Q 20/02 |
| 10,819,505 | B2* | 10/2020 | Ma | H04L 9/3257 |
| 2015/0379510 | A1* | 12/2015 | Smith | G06F 21/64 705/71 |
| 2016/0028552 | A1* | 1/2016 | Spanos | H04L 9/3242 713/178 |
| 2016/0261690 | A1* | 9/2016 | Ford | G06F 21/645 |
| 2016/0283290 | A1* | 9/2016 | Porat | H04L 67/567 |
| 2016/0321654 | A1* | 11/2016 | Lesavich | H04L 67/104 |
| 2017/0005804 | A1* | 1/2017 | Zinder | H04L 9/3239 |
| 2017/0011460 | A1* | 1/2017 | Molinari | H04L 9/3247 |
| 2017/0221052 | A1* | 8/2017 | Sheng | H04L 9/14 |
| 2017/0359374 | A1* | 12/2017 | Smith | G06F 21/6245 |
| 2018/0285840 | A1 | 10/2018 | Hasan | |
| 2018/0336552 | A1* | 11/2018 | Bohli | H04L 9/3297 |
| 2019/0260574 | A1* | 8/2019 | Shi | H04L 9/321 |
| 2021/0263907 | A1* | 8/2021 | Krueger | G06F 16/2315 |

OTHER PUBLICATIONS

Wenbo Wang et al: "A Survey on Consensus Mechanisms and Mining Strategy Management in Blockchain Networks", arxiv.org, Cornell University Library, 201 Olin Library Cornell University, Ithaca, NY 14853, May 7, 2018 (May 7, 2018), XP081021359, DOI: 10.1109/ACCESS.2019.2896108.

Dong Yuhao et al. Elasticoin: Low-Volatility Cryptocurrency with Proofs of Sequential Work 2019 IEEE International Conference on Blockchain and Cryptocurrency (ICBC) May 14, 2019 pp. 205 to 209.

Yves Igor Jerschow et al. Non-Parallelizable and Non-Interactive Client Puzzles from Modular Square Roots Availability, Reliability and Security (ARES) 2011 Sixth International Conference on IEEE Aug. 22, 2011 pp. 135-142.

PCT/IB2020/053995 International Search Report dated Jul. 7, 2020.

Dong Yuhao et al: "Elasticoin: Low-Volatility Cryptocurrency with Proofs of Sequential Work", 2019 IEEE International Conference on Blockchain and Cryptocurrency (ICBC), IEEE, May 14, 2019 (May 14, 2019), pp. 205-209, XP033571987, DOI: 10.1109/BLOC.2019.8751402.

Yves Igor Jerschow et al: "Non-Parallelizable and Non-Interactive Client Puzzles from Modular Square Roots", Availability, Reliability and Security (ARES), 2011 Sixth International Conference on, IEEE, Aug. 22, 2011 (Aug. 22, 2011), pp. 135-142, XP032460616, DOI: 10.1109/ARES.2011.27 ISBN: 978-1-4577-0979-1.

Luca De Feo et al: "Verifiable Delay Functions from Supersingular Isogenies and Pairings", IACR, International Association for Cryptologic Research vol. 20190220:182705 Feb. 15, 2019 (Feb. 15, 2019), pp. 1-27, XP061031846, http://eprint.iacr.org/2019/166.pdf.

UKIPO Search Report for application No. GB1906893.1, dated Oct. 21, 2019.

Boneh, D. et al., "Verifiable Delay Functions," Lecture Notes in Computer Science, 2018, vol. 10991, pp. 757-788.

Su X., et al., "Verifiable Sequential Work with Trusted Generator," 2019 Cryptography and Information Security Symposium, Jan. 2019, pp. 1-7.

* cited by examiner

SYSTEMS AND METHODS FOR NON-PARALLELISED MINING ON A PROOF-OF-WORK BLOCKCHAIN NETWORK

CROSS REFERENCE TO RELATED APPLICATIONS

This application is a U.S. National Stage of PCT Application No. PCT/IB2020/053995 filed on Apr. 28, 2020, which claims the benefit of United Kingdom Application No. 1906893.1, filed on May 16, 2019, the entire contents of which are incorporated herein by reference.

FIELD

This disclosure relates generally to methods and systems for improving processing efficiency, reliability, security and resource requirements for computational tasks performed within a network. The disclosure is particularly suited, but not limited, to use in respect of blockchain related mining, verification and resource transfer.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource. The term "Bitcoin" is used herein to include any version or variation that derives from or is based on the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset/resource between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Nodes on the network ("miners") ensure that each transaction is valid, with invalid transactions being rejected from the network. Software clients installed on the nodes perform this validation work on an unspent transaction by checking that it conforms to the blockchain's protocol rules and also by executing the locking and corresponding unlocking scripts. If execution of the locking and unlocking scripts evaluate to TRUE, the transaction is valid. Thus, in order for a transaction to be written to the blockchain, it must be i) validated by the first node that receives the transaction—if the transaction is validated, the mining node relays it to the other nodes in the network; and ii) added to a new block built by a miner; and iii) mined, i.e. added to the public ledger of past transactions.

In order to build new blocks, the miners compete by performing resource-intensive work with the aim of being the first to find a solution (proof of work, also known as a "PoW" or "nonce") to a computation (which can be known in the art as a "puzzle" or "challenge"). The difficulty of the puzzle can be adjusted over time to influence the rate at which new blocks are added to the blockchain. This is performed using a changeable difficulty parameter that influences how difficult it is to find the solution, so that the protocol can maintain the average time between new blocks at a relatively consistent rate as the network's hash power changes. In Bitcoin, miners use the SHA256 hashing algorithm to find a PoW which, when hashed, produces a hash value that is lower than or equal to the current difficulty level (parameter) set by the network protocol.

If a miner is the first to find the PoW to the current puzzle, that miner generates a new block which is then broadcast in a message to the other miners on the network. The new block must contain the verifiable PoW if the other miners are to accept it as valid. Thus, mining provides a consensus mechanism which ensures that nodes on the network are synchronised and in agreement as to the legitimate and current state of the blockchain. It also protects against certain types of potential network attack, providing security for the network.

In the early days of Bitcoin, the computational requirements of mining were sufficiently low that miners could use general purpose computers comprising standard CPUs. However, a miner with a more powerful computer has a competitive advantage over a miner with a less powerful one. This incentive, combined with an historical increase in puzzle difficulty, has resulted in widespread use of Application-Specific Integrated Circuit (ASIC) mining devices. Moreover, groups of ASIC devices can be linked to share the work involved in finding the PoW solution. In such cases, different machines can be used to try different PoW nonces or ranges thereof. Thus, the mining algorithm can be parallelised across devices.

However, the more powerful devices are more expensive and require more energy for operation and cooling. Some have also argued that a hardware inequality promotes potential centralisation of mining power within the network, leading to possible drawbacks or vulnerabilities. These concerns have prompted interest in the development of "ASIC-resistant" mining solutions. However, proposed solutions involve modification of the PoW algorithm to change the collision-resistant SHA256 hash algorithm to so-called 'bandwidth-hard' functions, with limited or debateable success.

Thus, there is a need to solve (at least) the technical challenge of how to preserve the consensus mechanism and security provided by competing nodes on a blockchain network while reducing the cost, energy usage and computational resources required, and preserving the advantages of a decentralised network.

The present disclosure addresses at least these technical concerns by providing aspects and embodiments which comprise non-parallelised mining (NPM) techniques, hardware and software arrangements, networking technologies and methods and combinations thereof that use a non-parallelisable consensus mechanism. The disclosure may use an inherently sequential algorithm to provide security for, and establish consensus on, the state of a blockchain.

Herein, we use the term "sequential algorithm" to refer to an algorithm which has to be executed in sequence, from start to finish, without other processing executing in parallel. Examples include iterative numerical methods such as Newton's method (Lipson, John D. "Newton's method: a great algebraic algorithm." *Proceedings of the third ACM symposium on Symbolic and algebraic computation.* ACM, 1976.) and algorithms that can be expressed mathematically using a recursive formula.

The term "inherently sequential" (or "non-parallelisable" as it may also be referred to herein) algorithm is used herein to refer to a sequential algorithm that cannot be optimized using parallelisable routines/subroutines. It should be noted that the phrase has not been rigorously defined within the technical field, although the definition used herein (see detailed description below in "adjustable difficulty mining function") is compatible with the intuitive usage of the term and definitions that exist in the literature (Greenlaw, Raymond. "A model classifying algorithms as inherently sequential with applications to graph searching." *Information and Computation* 97.2 (1992): 133-149).

SUMMARY

With reference to FIG. 1, the present disclosure provides alternative and improved systems and methods for blockchain mining. A non-parallelisable mining function or algorithm is used to mine a of blockchain transactions (UTXOs) which are to be added to a blockchain ledger.

By way of summary, this can be achieved by:

[step 1]: Identifying one or more transactions (UTXOs) from a plurality of transactions (UTXOs). This plurality may be a mempool in accordance with a blockchain protocol associated with a blockchain, blockchain protocol and blockchain network. In one or more embodiments, this is a proof-of-work blockchain/protocol/network

[step 2]: Generating a reward transaction ($TX_0$) if applicable according to the protocol

[Step 3]: Generating a representation R of the selected transactions (i.e. a block)

[Step 4]: Using a non-parallelisable mining algorithm to provide a computational output C which is a proof-of-computation solution for the block. This may also be referred to as a proof-of-work solution

[Step 5]: Sending a message to node(s) on the blockchain network, the message comprising the representation, the solution C and $TX_0$ (if applicable)

[Step 6]: upon receipt of the message the network node(s) attempt to verify the block. If verified by the majority of miners on the network, the block is added to the blockchain; otherwise it is rejected and not added to the blockchain.

BRIEF DESCRIPTION OF THE DRAWINGS

Aspects and embodiments of the present disclosure will now be described, by way of example only, and with reference to the accompany drawings, in which.

DETAILED DESCRIPTION

Figure 1:
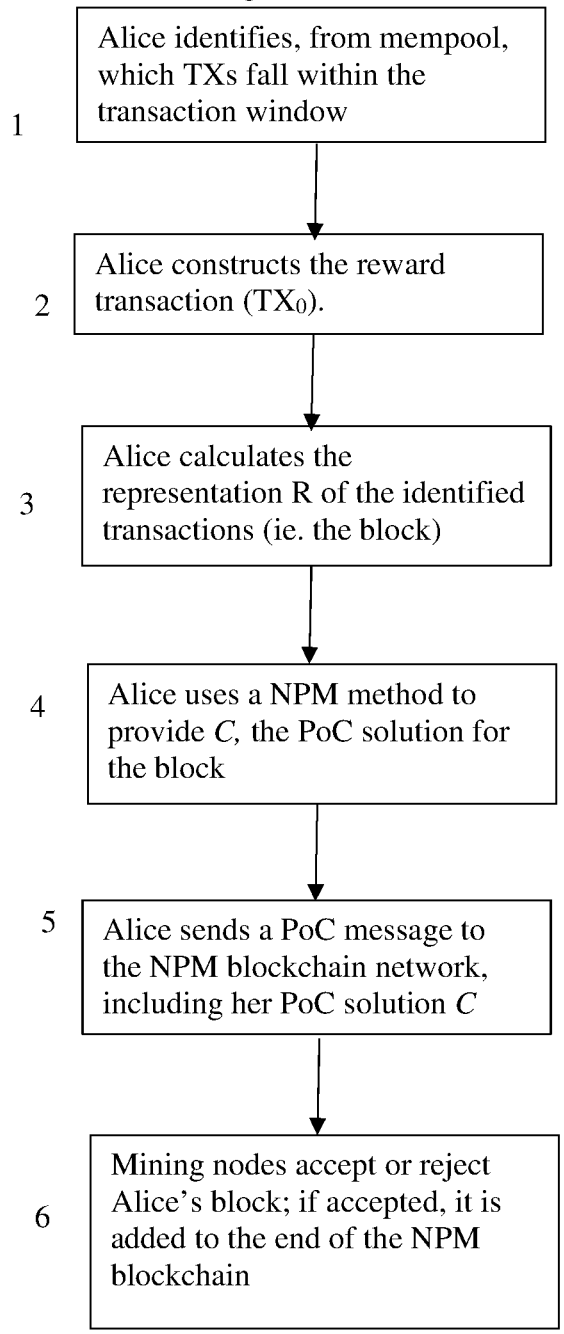
FIG. 1 is a flowchart illustrating an overview of an embodiment of the present disclosure.

We now describe an aspect of the present disclosure, comprising a generalised structure for a public, time-ordered ledger of transaction data, which may be referred to as a Non-Parallelised Mining (NPM) blockchain. It comprises the following elements:

I. Transactions, which exist within blocks;
II. Blocks comprising sets of transactions; and
III. Cryptographic links between blocks.

When taken together, these elements combine to form a blockchain ledger whereby all transaction data is aggregated into blocks of a standard form, such that successive blocks are related to each other, forming a chain, by including a cryptographic link (eg a hash) to the previous block.

Components of an Illustrative Embodiment

We will now describe the components which may be utilised in accordance with one or more embodiments of the present disclosure, and the terms used herein to refer to them.

A blockchain transaction (TX) is a standardised data structure encoding a transfer of some digital asset or resource from a first party to a second party. At a high level, each transaction comprises inputs and outputs. The inputs of a transaction each specify the following information:

i. A pointer to the record, a previous output on the ledger, that the digital asset exists
ii. The requisite unlocking condition(s) that authorises the sender (i.e. the first party) to transfer ownership of the asset (i.e. spend it). This will typically be a digital signature, or a secret known only to the first party.

The outputs of a transaction each specify the following information:

i. A recipient (i.e. the second party) to whom the ownership of the digital asset is transferred.
ii. The locking condition(s) that specifies how the recipient may subsequently unlock, and thus 'spend', the digital asset.

Each transaction that is to be recorded on the blockchain ledger is assigned a unique identifier. The identifier we will choose to use for one or more illustrative embodiments herein is termed a Transaction Identifier. The identifier is the hash of the transaction TX and a second parameter X, $$Y(TX,X)=H(TX\|X).$$

The parameter X is the hash of the previous block header. The transaction also includes a timestamp, $T_{TX}$, which depends on when the transaction was first created, not when the miners/network nodes have first seen them.

In addition, each transaction includes a timestamp to signify when it was created. The non-parallelised mining algorithm used by the blockchain embodiments described in this disclosure uses timestamped transactions.

The reward transaction denoted $TX_0$, is the first transaction in each block and distributes newly minted NPM coins to the miner who is the first to produce a valid block. It is structurally identical to a standard transaction, as described above, except for the fact that it can only have one input. This is because the total reward for mining a block is interpreted as the combination of a standard block reward and transaction fees. This means that there is no need for an 'input' in the usual sense, and therefore the fields of its input(s) are null and can be used to store arbitrary data. Note also that, in general, a reward transaction does not require a timestamp, as it will always be the first transaction in a block.

A block (B) is a standardised data structure that aggregates a set of transactions and is appended to the public blockchain digital ledger. At a high level, each block comprises a set S of standard transactions, a single reward transaction and a block header. The transaction set S is the complete set of N transactions that are included in a block, written as $$S := \{TX_1, TX_2, \ldots, TX_N\}.$$

The reward transaction $TX_0$ is a transaction that may be included in each block and used to remunerate the miner responsible for appending that block to the blockchain. This transaction is not considered a part of the transaction set S, even though they are both included in the same block. Note that in accordance with one or more protocols, the reward transaction may not be included, or may cease to be included in the block, once a predetermined mining threshold has been reached.

The block header $\phi$ may comprise many fields of data relating to the block of transactions it contains, such as the block number, the time at which the block was added to the blockchain or the version of the blockchain protocol rules used. However, the key elements that must appear in a block header are:
  i. A cryptographic link X;
  ii. A representation $R := G(TX_0, S)$ of $TX_0$ and the transaction set S, where G is an algorithm; and
  iii. A computation solution $Y_N^C$ to the mining algorithm
  iv. Block timestamp $T_B$ The requirements of the algorithm G are that it must take the entire set S of transactions in a block, plus the reward transaction $TX_0$, as inputs and it must return a single value R that can be used to represent these N+1 transactions. A suitable choice for G would be a Merkle tree generation algorithm, where R would correspond to the Merkle root.

The cryptographic link could take one of many forms, such as a digital signature or hash digest. Herein, for illustrative purposes and ease of reference, we consider the cryptographic link X to be the hash of the previous block header.

The computation solution $Y_N^C$ (or C) is a value to be interpreted as the output of a non-parallelised mining technique/algorithm. This solution must be calculated before a block can be added to the blockchain and it represents a proof of computation, without which no block can be considered valid. The PoC solution described herein can be viewed as analogous to the Bitcoin PoW puzzle solution or "nonce". It may also be referred to herein as C. This PoC solution is a global solution to a computationally hard, but deterministic problem that is solved by the nodes which implement embodiments of the present disclosure.

In order to connect the blocks in a meaningful way, such that they form an immutable chain, there needs to be a method of linking one block to the next. This is achieved by constructing a cryptographic link X between a block and its direct predecessor. The properties required of such a cryptographic link are as follows:
  i. Each link must be one-way.
  ii. Each link must connect exactly two blocks.
  iii. Each pair of connected blocks must appear consecutively in the blockchain.

These features form the basis for choosing the cryptographic link X to be the hash of the previous block header, which we define as such $$X_i := H(\phi_{i-1}),$$

where the index i denotes the block number. Here, we have also denoted a one-way cryptographic hash function by H. Each time a new block is constructed, it must include the hash of the previous block header $H(\phi_{i-1})$ within its own block header $\phi_i$. The term 'previous block' is used herein to mean the most recent block to have been successfully appended to the blockchain. This means that each new block is connected directly to the last, in sequence, all the way back through the chain until the first block, $B_0$, is reached.

The rules that govern the state of the NPM blockchain are referred to as its protocol rules. These rules can be summarised as:
  i. The format of a transaction;
  ii. The format of a block;
  iii. The rules for validating a transaction;
  iv. The rules for validating a block; and
  v. How a new block is appended to the ledger (via the mining process)

Validation of Transactions

A valid transaction, in the most general case, must be of the accepted standard format according to the protocol rules. General rules for a transaction are
  Total value of inputs must be greater than or equal to total value outputs
  The transaction timestamp must be less than or equal to the block timestamp In accordance with embodiments of the NPM blockchain system disclosed herein, no further conditions need to be imposed for a transaction to be valid. However, one or more embodiments of a NPM blockchain may require additional validation rules that could be placed on transactions, such as a maximum size or maximum transfer or digital asset per transaction, limits on number of inputs/outputs and requirements on input and output data so that digital asset ownership rights can be properly established.

Validation of Blocks

A valid block must contain:
  i. A set $S := \{TX_1, TX_2, \ldots, TX_N\}$ of exactly N standard transactions;
  ii. Exactly one reward transaction $T_0$;
  iii. A valid cryptographic link X to the previous block;
  iv. A representation R, consistent with the transaction set S and $TX_0$; and
  v. A valid proof of computation C.

If a block meets all five of these criteria, then it is valid and may be appended to the blockchain. It should be noted that, at any given time, there may be a number of valid candidate blocks, differing only by the reward transaction and who this pays the mining reward to. This situation arises when multiple miners independently compute the correct PoC proof C.

The mining process plays the role of determining which one of these many candidate blocks, one from each successful miner, is appended to the blockchain. In short, there will always be a miner who is 'first' to find the proof of computation C and it is their block, with their reward transaction, that will be appended to the blockchain according to the protocol's mining algorithm. We now turn our attention to discussion of a non-parallelisable mining (NPM) method which can be used by embodiments of the NPM mining nodes and NPM blockchain disclosed herein.

Non-Parallelisable Consensus Mechanism

Embodiments of the present disclosure utilise a mining technique for achieving consensus on the state of the blockchain in a decentralised way. Nodes which implement this technique use a non-parallelisable (also known as inherently sequential, or "embarrassingly sequential") algorithm to add a new block to the blockchain. Also, consensus on the state of the blockchain is achieved at regular intervals.

This ensures that the entire network can agree on a new block using an algorithm that is resistant to parallel computing, avoiding at least the technical difficulties mentioned above. In turn this makes it difficult for any mining entity or group to increase dominance (and thus potential control) of the network through CPU clustering or inequalities in hardware.

The non-parallelised mining approach requires all miners on the network competing to be the first to find the PoC solution for a candidate block. These nodes adopt protocol rules which could include at least the following requirements:
1. Miners attempt to mine exactly N transactions in a block where N is a predetermined constant;
2. Miners attempt to mine identical candidate blocks in each cycle;
3. Mining cycle time:
   a. The expectation value for mining cycle time is always greater than block validation time;
   b. There is a random variance in the mining cycle time;
4. Network latency is sufficiently low, as discussed in more detail below Achieving Pre-consensus Miners need to agree on the same set of transactions that should be included in their candidate block. In other words, they agree on the set and order of transactions to be included in their candidate block. In order to achieve this, the nodes implement at least the following rules:

Each transaction is timestamped at the point of creation.
All transactions are ordered by their timestamp.
The protocol is able to identify an instant represented by a timestamp for each candidate block. We call this timestamp $T_{B_i}$ for block $B_i$.

To prevent malicious users from choosing a timestamp much earlier than it should be, a protocol accordance with an embodiment of the disclosure requires that nodes reject any transaction which has a timestamp that is earlier than a previous block timestamp that is already recorded on, i.e. has been added to, the blockchain. This ensures that all miners have the same set of transactions in their candidate block excluding the reward transaction (which can be viewed as analogous to the coinbase transaction in Bitcoin).

Common Transaction Set

In accordance with one or more embodiments, all mining nodes on the network have the same set (a dynamic mempool) of transactions to be included in the next block. This ensures that all miners attempt to mine blocks that contain identical transactions (other than the reward transaction). This requires at least the following conditions:

Each transaction is timestamped at the point of creation.
All transactions are ordered by their timestamp (global transaction ordering).
All transactions that have timestamp earlier than $T_{B_i}$ have to be included in block $B_i$.

The number of transactions $N_i$ mined in each block, $B_i$, is equal to the total number of transactions seen (and validated) between $T_{B_{i-1}}$ and $T_{B_{i-1}}$+3×(Expected block generation time). This is described in more detail below.

These conditions enable the establishment of network consensus. To prevent malicious parties from choosing a timestamp earlier than it should be, the protocol requires that any transaction which has a timestamp that is earlier than a previous block's timestamp will be rejected. This ensures that each miner has exactly the same set of transactions in their candidate block excluding the reward transaction.

Adjustable Difficulty Mining Function

The difficulty is measured by the number of operations performed in the mining function. The standard mining function can be defined as:

$$F(Y_1, \ldots, Y_N, X, t)$$

where $\{Y_1, \ldots, Y_N\}$ is the set of N transaction identifiers, X is the previous block hash and t is the difficulty parameter included in the block header. Key features of a mining protocol or function disclosed herein include:

Non-Parallelisable algorithm: the algorithm requires the calculation of intermediary outputs which can only be performed in sequence, rather than parallel; the calculation of an intermediary output takes an input which is the output of a previous intermediary calculation, and in turn provides its result/output to a subsequent intermediary calculation. This may repeat until a stopping condition is encountered Adjustable computational difficulty using an integer parameter t Inputs include transaction identifiers/block header hashes and the difficulty parameter Computing F requires a target number of arithmetic operations, K The canonical example of a non-parallelisable algorithm is a recursive formula, where the output of a function is used as an input in the next instantiation of the same or another function. Another example is modular exponentiation or repeated squaring—see Rivest, Ronald L., Adi Shamir, and David A. Wagner, "Time-lock puzzles and timed-release crypto." (1996).

An example of an algorithm that uses both recursion and modular exponentiation is provided by way of illustration as follows:

Given $\{Y_0, \ldots, Y_N\}$,
Compute $$Y_{0S} = Y_0^{2^t} \bmod X,$$

For i from 0 to N−1 compute $$Y_{i+1S} = (Y_{iS} + Y_{i+1})^{2^t} \bmod X,$$

where the execution of the algorithm yields $Y_{NS}$. In this case the mining function can be written compactly as $$F(Y_1, \ldots, Y_N, X, t) = Y_{NS}$$

Mining Operations Target

The global transaction set and mining function necessitate that miners perform K arithmetic operations where $$K = K(N, t)$$

This ensures that the block generation time $T^G$ is consistent and can be controlled by the network. Given that F is a function with N recursions, K is linear in N and the difficulty parameter t is adjustable and not directly dependent on transactions so that a large range of K values can be achieved.

As an example, using F as described above, suppose the difficulty is t=1000. Then computing F requires 2×1000=2000 repeated squaring operations for each $Y_{iS}$ and therefore K=O(2000IV). Alternatively, if t=1 then K=O(2N). t can be adjusted and included in the block header.

Example 1: Maximum Number of Transactions Per Block

One implementation of the mining technique requires at most N transactions in a block, where N is a constant value. By fixing N the variability of K can be controlled through t alone.

It is worth noting that miners are also not incentivised to include more than N transactions in a block, as this would increase their computation time and reduce their probability of being the first miner to successfully mine the block.

Dummy Transaction Identifiers

In the case where the number of available transactions in the mempool is below N we can define dummy transaction identifiers. Assume that the total number of transactions in the mempool is $n(n \leq N)$ with transaction identifiers $Y_1, \ldots, Y_n$. We create a sequence of dummy transaction identifiers as a hash chain generated by using $Y_n$ as the seed $$Y_{n+i+1} = H(Y_{n+i} \| X).$$

These dummy transaction identifiers will then be used as inputs alongside the standard transaction identifiers in the mining function. Note that dummy transaction identifiers can only be generated sequentially.

Example 2: Variable Number of Transactions Per Block

An alternative implementation allows a variable N value by fixing $T_{B_i} - T_{B_{i-1}}$ for each block. In this case, to effectively control K, t must dependent on N i.e.

$$K = K(N, t), t = g(N),$$

where g is a simple function of N. As a result, there would be no need for computing dummy transaction identifiers. However, in order to deal with the large range in transaction volume t may vary considerably from block to block.

Network Latency

Preferably, network latency is negligible or is reasonably close to zero. This means that messages, sent from one mining node to another, will be propagated across the entire network in a small period of time. More specifically, the message transmission time should be much smaller than the variance mining cycle time between miners, $$\text{Network latency} \ll \sigma^2(T^G)$$

where $\sigma^2(T^G)$ is the variance in block generation time for the network. Recall that this variance is simply the difference in sequential computing speed between miners. It needs to be probable that, if a first miner, Alice, obtains a successful proof-of-computation solution before a second miner, Bob, (due to mining cycle variance), then Alice needs to be able to propagate her solution to Bob in short enough time that it is unlikely Bob has also found the solution before receiving Alice's solution message.

The Mining Cycle

Constructing the Candidate Block—Miner Alice

With reference to FIG. 1, given $T_{B_{i-1}}$ at step 1 Alice gathers all transactions, say $\{TX_1, \ldots, TX_N\}$, in her mempool, that were created in the time interval $$T_{B_{i-1}} \leq T_{TX_i} \leq T_{B_{i-1}} + 3E(T^G),$$

where $E(T^G)$ is the expected block generation time for a block on the network as described above. We call $[T_{B_{i-1}}, T_{B_{i-1}} + 3E(T^G)]$ the transaction time window for block $B_i$.

Setting a large range of transaction times allows for fluctuations in block generation time. It is assumed the block timestamp for $B_i$ will be lower that the transaction time window upper limit i.e.

$$T_{B_{i-1}} + E(T^G) \approx T_{B_i} \leq T_{B_{i-1}} + 3E(T^G).$$

In the case that block generation time exceeds $3E(T^G)$—which is highly unlikely—transactions must not be excepted/relayed by the network in the time range $T_{B_{i-1}} + 3E(T^G) \leq T \leq T_{B_i}$.

She then proceeds as follows

2. Step 2: Alice constructs a reward transaction, $TX_0$. It should be noted that this step is optional as a reward transaction may not always be included in the block.
3. Step 3: Alice calculates a representation, R, of all transactions in the block except for the reward transaction if one is to be included
4. Step 4: Alice mines the block by executing an embodiment of the non-parallelisable mining technique, such as:
   a. Calculate $X_i = H(\phi_{i-1})$.
   b. $Y_{1S} = Y_1^{2^t} \mod X$
   c. For i from 2 to N
      i. Calculate $Y_i = H(TX_i \| X)$.
      ii. Calculate $Y_{iS} = (Y_{i-1S} + Y_i^{2^t})^{2^t} \mod X$
5. Step 5: Alice sets $C = Y_{NS}$—the computation solution for the block
6. Step 6: Alice propagates h(C), $TX_0$ and $T_{B_i}$ to the network. She does this by sending a Proof-of-Computation (PoC) message to the nodes.
7. Step 7: Mining nodes test the PoC C provided by Alice; if accepted by the NPM network as correct and valid, Alice's block is added to the NPM blockchain.

Note: we have used the example mining function described above for the sake of clarity and ease of understanding. However, in general Step 2 is an execution of F to find the proof of computation C.

Verification

To verify h(C), a miner has to find the Proof of Computation solution, C. Upon receipt of Alice's PoC message, the other miners continue their work to find their own solution. Once a miner has found his own solution, he can compare that with Alice's solution to perform the verification of her version of C. He does this by constructing Alice's block by adding her reward transaction and comparing the hash value of the block header with $h(B_i)$. If they are equal, Bob drops all other threads of calculation, and continues calculating the thread that assumes Alice's block is the correct one. If they are not equal, Bob finds the next received $Y_M$ value thread that matches the hash value and continues from that thread.

Bob is incentivised to mine the new block as soon as Alice, otherwise Alice will be able to produce the longest chain to claim all the rewards.

Mining Cycle Time

Block Generation Time

The block generation cycle time $T_i^G$ is the time taken, by some $i^{th}$ miner, to generate a block using the proposed mining function F is denoted by $T_i^G$. The block generation time is the time taken for a given miner to calculate the correct proof of computation C for the candidate block.

We assume this cycle time $T_i^G$ to be a continuous, normally-distributed random variable. The expectation value, variance and standard deviation in the mining cycle time are denoted respectively as the following $$E(T^G), \sigma^2(T^G), \sigma(T^G).$$

The block generation time is a parameter of the mining technique, which means the expectation value can be scaled to a duration according to the implementation. For instance, it may be desirable to set $E(T^G) \sim 10$ minutes in one embodiment versus $E(T^G) \sim 1$ minute in another. In any case, the expectation time is scaled by increasing the number of operations m performed in the mining technique, according to the set of inequalities $$E(T^G) \propto m,$$

$$m \propto N, m \propto t,$$

where N is the number of transactions in a block and t is the difficulty parameter.

Block Validation Time

Consider two miners $M_A$ and $M_B$ attempting to mine the same candidate block. The observed times taken for these miners to successfully mine the block are denoted by $T_A^G$ and $T_B^G$ respectively, and these are both governed by the normal distribution defined above.

If, for a given cycle, $T_A^G < T_B^G$ then $M_A$ is the first miner to successfully mine the candidate block by definition. Once the first miner $M_A$ has successfully mined the given block, by calculating and broadcasting their Proof of Computation $C_A$, the second miner $M_B$ (and all other miners) validate the block by independently completing the mining cycle and verifying that the proof provided by $M_A$ is equal to their independently calculated proof $C_B$. The block is considered valid by the second miner iff $C_B = C_A$. The time taken for the second miner $M_B$ to perform this validation process is denoted by $T_{B,A}^V$, or in the general case for any $j^{th}$ miner performing a validation on an $i^{th}$ miner's block, denoted by $T_{j,i}^V$, ($i \neq j$).

For a sufficiently large network of miners we can assume the block validation time $T_{j,i}^V$ is also a normally-distributed random variable because it can be constructed as the combination of two independent, normally distributed random variables $T_i^G$ and $T_j^G$, whose expectation value, variance and standard deviations are identical. The expectation value, variance and standard deviation of the block validation time are therefore given by the following relations:

$$T_{i,j}^V = \text{Max}_j(T_i^G - T_j^G),$$
$$= T_i^G - \text{Min}_j(T_j^G).$$

Given that 99.7% of $T_i^G$ exist within 3 standard deviations of $E(T^G)$, we can make the approximation $$\text{Min}_j(T_j^G) \approx E(T^G) - 3 \cdot \sigma(T^G).$$

Given the assumption of minimum generation time described above the expected block time can be calculated as $$E(T_{i,j}^V) = E(T_i^G - \text{Min}_j(T_j^G)) \approx E(T^G) - E(T^G) + 3E(\sigma(T^G)) = 3 \cdot \sigma(T^G),$$

and standard deviation $$\sigma(T_{i,j}^V) = \sigma(T_i^G - \text{Min}_j(T_j^G))$$
$$\approx \sigma(T_i^G - K)$$
$$= \sigma(T^G),$$

meaning that the ranges for validation time are $$0 < E(T_{i,j}^V) < 6 \cdot \sigma(T^G)$$

which can be seen as bounding the validation time by the worst cases:
(i) $M_A$ completes the mining algorithm first and $M_B$ completes the algorithm as late as possible [RHS condition]; and
(ii) $M_A$ completes the mining algorithm at any time and $M_B$ completes the algorithm a small time later [LHS condition].

Thus, in one or more embodiments of the present mining algorithm, the block generation timescale $T_i^G$ is significantly greater than the block validation timescale $T_{j,i}^V$. It can be seen that this is an assumption about the tightness in the distribution of the block generation time by writing the assumption as $$E(T_{j,i}^V) << E(T_i^G),$$

and using the inequality that defines the block validation time to rewrite this as $$0 < E(T_{j,i}^V) < 6 \cdot \sigma(T^G) << E(T^G).$$

Thus, for participating network nodes, the variance in the block generation time is significantly smaller than the expectation block generation time itself. This is a reasonable assumption given the reference expectation time of $E(T^G)$ ~10 minutes, with expected variance being a few seconds.

In practice the mining technique may result in one of three common scenarios. These scenarios are detailed from the perspective of honest miners Alice and Bob who are given the notation $M_A$ and $M_B$ respectively. We also include a third malicious miner $M_M$ (Mallory), to illustrate how miners would behave and interact with one another during a typical non-parallelised mining cycle.

Scenario 1: Alice is First to Successfully Mine and Broadcast a Valid Block

Alice reaches the end of the mining cycle independently, without hearing of any other successful block having been mined and broadcasts her block to the network.

Alice Receives a Valid Block from Bob First

Alice receives a block from another miner Bob. She continuous to mine her own block whilst validating Bob's in parallel.

Note that only mining and validation are done in parallel—the mining algorithm itself is not parallelisable. Using the assumption $T_A^G > T_a^V$, Alice will be able to validate Bob's block before she mines an alternative.

Alice Receives an Invalid Block from Mallory First

Alice receives a block from a malicious miner Mallory. She continuous to mine her own block whilst validating Mallory's in parallel. Note that only mining and validation are done in parallel—the mining algorithm itself is not parallelisable at any point.

Possibility of DoS Attacks

Given that a miner is required to open a new thread every time they have been sent a computation solution, there is the possibility of exploits being launched, such as a Denial-of-Service attack. This can be address by applying certain rules or constraints:
1. Only one PoC message per miner is accepted by other nodes
2. Mining nodes can only accept PoC messages after sufficient time has passed since the last block was mined on the network One or more known spam defences can be used to prevent an individual miner from being forced to open a large number of computation threads.

Illustrative, enumerated embodiments of the disclosure:
1. A computer or blockchain implemented (mining) method comprising the step of:
using a non-parallelisable algorithm to calculate an output based on:
a computational difficulty parameter;
a hash of at least one blockchain transaction; and/or
a hash of at least one blockchain block header.

The non-parallelisable algorithm may be referred to as a sequential algorithm or inherently sequential algorithm. The output may be a value. It may be a solution to a puzzle (which may, alternatively, be called a "challenge", "computational challenge" or "problem"). It may be the output of a function or method. The algorithm may be executed by one or more nodes of a blockchain network. These may be mining nodes. The computation difficulty parameter and the transaction and block header hashes may be used as inputs to the algorithm. Other inputs may also be provided to the algorithm. The output may be provided to node(s) on the blockchain The method may be described as a blockchain security method, a blockchain mining method, a non-parallelisable consensus mechanism/method, a blockchain consensus method, and/or a blockchain-implemented block generation method.

2. A method according to 1, and further comprising the step of: sending the output, or a representation that is or comprises the output, to a network of blockchain nodes. The representation of the output may comprise a hash of the output. The nodes may be mining nodes of a blockchain network.

3. A method according to 1 or 2 wherein the non-parallelisable algorithm for obtaining the output may comprise at least one of the following operations:
   a recursive operation;
   a modular exponentiation;
   a repeated squaring operation.

Thus, the NPM algorithm may comprise and/or require the execution of one, all or some combination of these operations.

4. A method according to any combination of 1 to 3 and comprising the step of: selecting at least one blockchain transaction from a set of blockchain transactions, wherein the at least one blockchain transaction is selected based on a timestamp provided in the at least one blockchain transaction.

The set or "plurality" of blockchain transactions may be referred to as a "mempool". The mempool may be arranged and/or used as described above. The mempool may comprise blockchain transactions which comprise at least one unspent output (UTXO). The same mempool may be shared or accessible by all (mining) nodes on the blockchain network. One or more of the nodes may have their own copy of the set.

5. A method according to 4, wherein the at least one selected blockchain transaction may comprise a timestamp which is derivable or identifiable from the state of the blockchain.

6. A method according to 4 or 5 wherein the at least one selected transaction may comprise a timestamp that is later than the timestamp of a block or a blockchain transaction that is recorded on a blockchain.

7. A method according to 4, 5 or 6 and further comprising the step of: calculating a representation of the at least one selected blockchain transaction. The representation of the at last one selected blockchain transaction may be or may comprise a hash.

8. A method according to any combination of 1 to 7 and comprising the step of:
   receiving a representation of the output at a second blockchain network node from a first blockchain network node. It may also comprise verifying the (received) output at the second blockchain network node. The step of verifying the output may comprise the step of comparing the received output (or version thereof) with a verification output computed by the second blockchain node, wherein the second blockchain node computes the verification output using the same non-parallelisable algorithm and the same inputs as the first blockchain node.

9. A method according to 8 wherein the step of verifying the output at the second blockchain network node may comprise:
   calculating the output at the second blockchain network node;
   generating a representation of the output at the second blockchain network node;
   comparing the representation generated at the at the second blockchain network node with the representation received from the first blockchain network node.

10. A method according to any combination of 1 to 9 wherein the computational difficulty parameter is a value which influences, determines and/or controls the number of operations required by the non-parallelisable algorithm to calculate the output.

11. A method according to any combination of 1 to 10 wherein the non-parallelisable algorithm:
    i) requires the calculation of one or more intermediary values in order to calculate the output; and/or
    ii) cannot be executed by a plurality of parallelised computing resources.

12. A method according to any combination of 1 to 11 and comprising the step of generating a blockchain block comprising or one more blockchain transactions.

13. A method according to 12 and further comprising the step of adding the blockchain block to the blockchain. This may be achieved as described above, using a cryptographic link to associate the newly generated block to the previous (last) block that was recorded on (ie added to) the blockchain.

According to another aspect of the disclosure, there is provided a computer implemented system arranged to perform any method step or combination of method steps described or claimed herein. There is provided a blockchain system (network) comprising a plurality of computer-implemented nodes, wherein each node in the blockchain network comprises:
   a processor; and
   memory including executable instructions that, as a result of execution by the processor, causes the system to perform any variation of the computer-implemented method claimed or described herein.

The network may be arranged to operate using a blockchain protocol as described herein. According to another aspect, there is provided a non-transitory computer-readable storage medium having stored thereon executable instructions that, as a result of being executed by a processor of a computer system, cause the computer system to perform any version of the computer-implemented method claimed or described herein.

Figure 2:
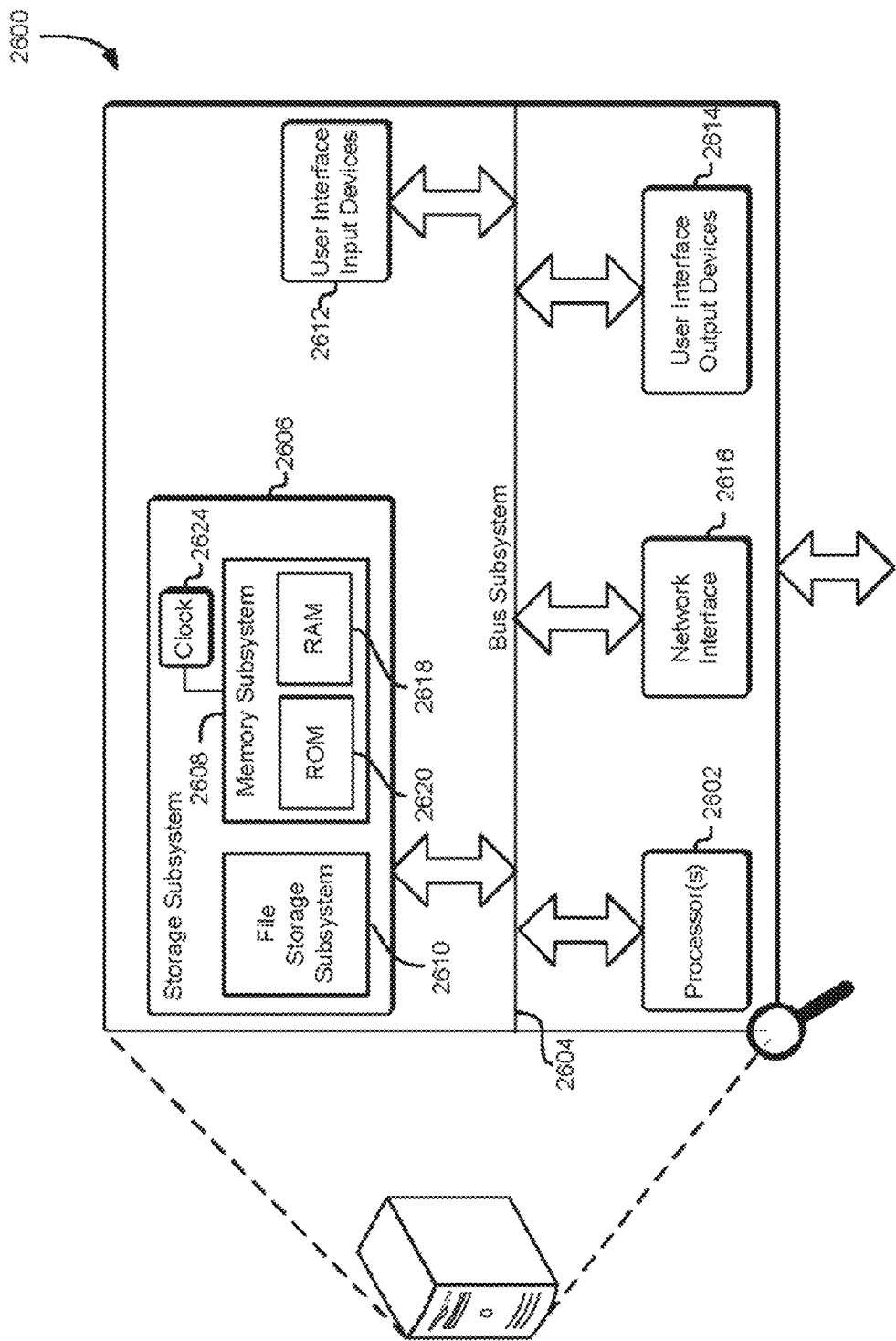
FIG. 2 is a schematic diagram illustrates a computing environment in which various embodiments can be implemented.

Turning now to FIG. 2, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a web server or one or more processors or computing devices associated with a payment service or a payment client entity, i.e. to implement a host responsible for provision of the payment service, or to implement a payer or payee payment client entity. Thus computing device 2600 may be a portable computing device, a personal computer, or any electronic computing device. As shown in FIG. 2, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 2 is intended only as a specific example for purposes of illustrating the preferred embodiment of the device.

Many other configurations having more or fewer components than the system depicted in FIG. 2 are possible.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". Throughout this specification the word "comprise", or variations such as "includes", "comprises" or "comprising", will be understood to imply the inclusion of a stated element, integer or step, or group of elements, integers or steps, but not the exclusion of any other element, integer or step, or group of elements, integers or steps. The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer implemented method comprising the step of:
   mining the block of blockchain transactions, wherein the block comprises:
   i) a set S of N blockchain transactions, where the set S is agreed by blockchain network nodes on a blockchain network; and
   ii) a proof-of-computation solution for the block of blockchain transactions that has been calculated as an output of a non-parallelisable algorithm that has been provided with inputs, the inputs comprising:
   a computational difficulty parameter which influences or controls a number of operations required by the non-parallelisable algorithm to calculate the output;
   a hash of at least one blockchain transaction; and/or
   a hash of at least one blockchain block header.

2. The method of claim 1, further comprising the step of:
   sending the output, or a representation of the output, to the blockchain network nodes.

3. The method of claim 1 wherein the non-parallelisable algorithm comprises at least one of the following operations:
   a recursive operation;
   a modular exponentiation; and
   a repeated squaring operation.

4. The method of claim 1, further comprising the step of:
   selecting at least one blockchain transaction from a set of blockchain transactions, wherein the at least one blockchain transaction is selected based on a timestamp provided in the at least one blockchain transaction.

5. The method of claim 4, wherein the at least one selected blockchain transaction comprises a timestamp that is derivable or identifiable from a state of the blockchain.

6. The method of claim 4, wherein the at least one selected transaction comprises a timestamp that is later than the timestamp of a block or a blockchain transaction that is recorded on a blockchain.

7. The method of claim 4, further comprising the step of:
   calculating a representation of the at least one selected blockchain transaction.

8. The method of claim 1, further comprising the step of:
   receiving a representation of the output at a second blockchain network node from a first blockchain network node and verifying the output at the second blockchain network node.

9. The method of claim 8 wherein the step of verifying the output at the second blockchain network node comprises:
   calculating the output at the second blockchain network node;
   generating a representation of the output at the second blockchain network node; and
   comparing the representation generated at the second blockchain network node with the representation received from the first blockchain network node.

10. The method of claim 1, wherein the non-parallelisable algorithm:
    requires the calculation of one or more intermediary values in order to calculate the i) output; and/or
    ii) cannot be executed by a plurality of parallelised computing resources.

11. A blockchain network comprising a plurality of nodes, wherein each node in the blockchain network comprises: a processor; and memory including executable instructions that, as a result of execution by the processor, causes the blockchain network to perform the computer-implemented steps of: mining the block of blockchain transactions, wherein the block comprises:
    i) a set S of N blockchain transactions, where the set S is agreed by blockchain network nodes on a blockchain network; and ii) a proof-of-computation solution for the block of blockchain transactions that has been calculated as an output of a non-parallelisable algorithm that has been provided with inputs, the inputs comprising:
    a computational difficulty parameter which influences or controls a number of operations required by the non-parallelisable algorithm to calculate the output; a hash of at least one blockchain transaction; and/or a hash of at least one blockchain block header.

12. A non-transitory computer-readable storage medium having stored thereon executable instructions that, as a result of being executed by a processor of a computer system, cause the computer system to perform the computer-implemented steps of:
    mining the block of blockchain transactions, wherein the block comprises:
    i) a set S of N blockchain transactions, where the set S is agreed by blockchain network nodes on a blockchain network; and
    ii) a proof-of-computation solution for the block of blockchain transactions that has been calculated as an output of a non-parallelisable algorithm that has been provided with inputs, the inputs comprising:
    a computational difficulty parameter which influences or controls a number of operations required by the non-parallelisable algorithm to calculate the output;
    a hash of at least one blockchain transaction; and/or a hash of at least one blockchain block header.

13. The blockchain network of claim 11, wherein the executable instructions, as a result of execution by the processor, causes the blockchain network to perform the computer-implemented step of:
    sending the output, or a representation of the output, to the a network of blockchain network nodes.

14. The blockchain network of claim 11, wherein the non-parallelisable algorithm comprises at least one of the following operations:
    a recursive operation;
    a modular exponentiation; and
    a repeated squaring operation.

15. The blockchain network of claim 11, wherein the executable instructions, as a result of execution by the processor, causes the blockchain network to perform the computer-implemented step of:
    selecting at least one blockchain transaction from a set of blockchain transactions, wherein the at least one blockchain transaction is selected based on a timestamp provided in the at least one blockchain transaction.

16. The blockchain network of claim 15, wherein the at least one selected blockchain transaction comprises a timestamp that is derivable or identifiable from a state of the blockchain.

17. The non-transitory computer-readable storage medium of claim 12, wherein the executable instructions that, a result of being executed by a processor of a computer system, cause the computer system to perform the step of:
    sending the output, or a representation of the output, to a network of blockchain nodes.

18. The non-transitory computer-readable storage medium of claim 12, wherein the non-parallelisable algorithm comprises at least one of the following operations:
    a recursive operation;
    a modular exponentiation; and
    a repeated squaring operation.

19. The non-transitory computer-readable storage medium of claim 12, wherein the executable instructions, as a result of being executed by the processor of the computer system, cause the computer system to perform the step of:
    selecting at least one blockchain transaction from a set of blockchain transactions, wherein the at least one blockchain transaction is selected based on a timestamp provided in the at least one blockchain transaction.

\* \* \* \* \*